L. R. CARPENTER.
Carriage-Brake.
No. { 2,861, 33,865. }
Patented Dec. 3, 1861.
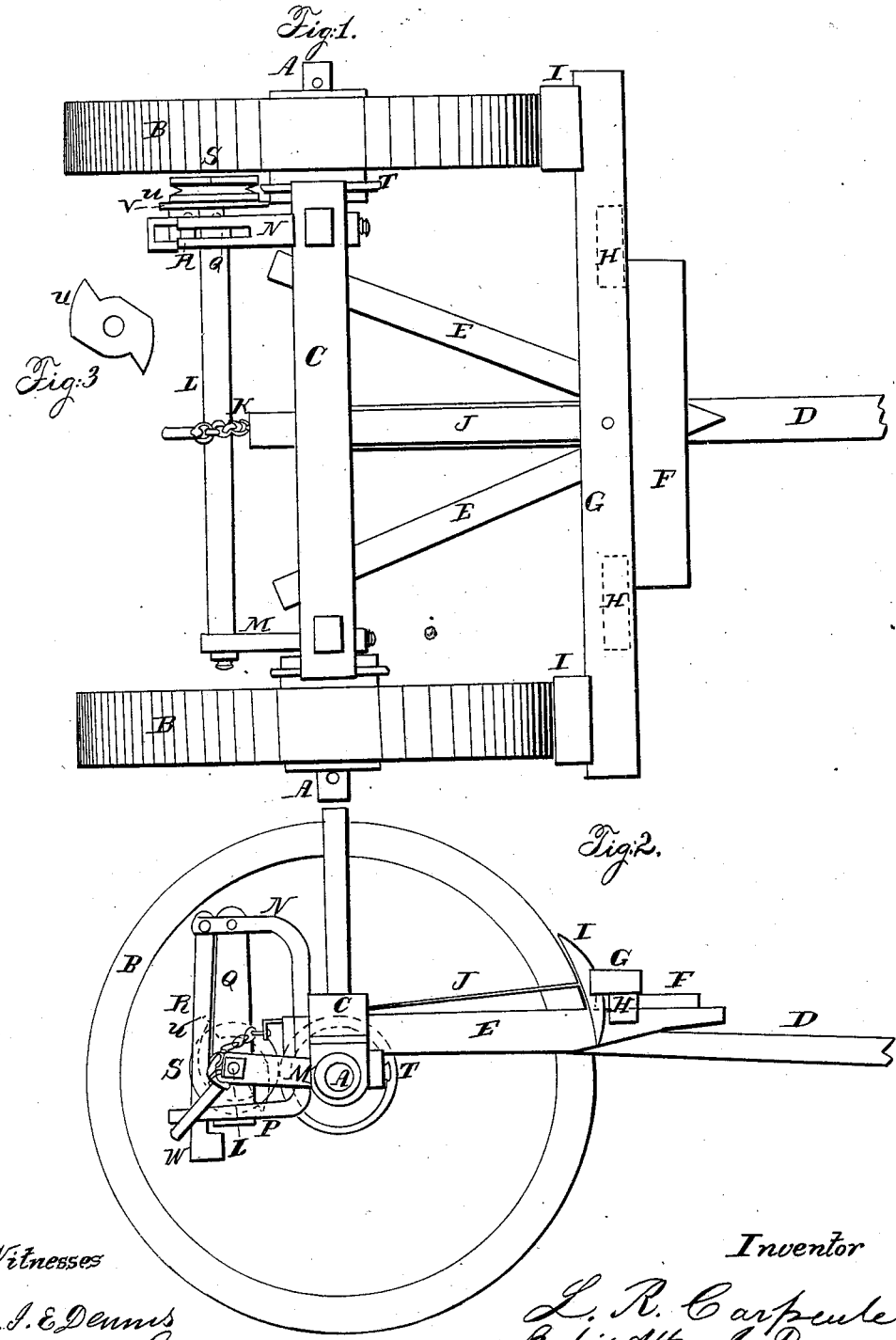
Witnesses
J. E. Dennis
Thomas Creaser
Inventor
L. R. Carpenter
By his Atty J. Dennis Jr

UNITED STATES PATENT OFFICE.

LEWIS R. CARPENTER, OF LANCASTER, OHIO, ASSIGNOR TO HIMSELF AND SAMUEL K. WILLIAMS.

IMPROVEMENT IN CARRIAGE-BRAKES.

Specification forming part of Letters Patent No. 33,865, dated December 3, 1861.

*To all whom it may concern:*

Be it known that I, LEWIS R. CARPENTER, of Lancaster, Fairfield county, and State of Ohio, have invented certain new and useful Improvements in Wagon and Carriage Brakes; and I do hereby declare that the same are described and represented in the following specification and accompanying drawings.

The nature of my invention and improvements consist in arranging a roller on a shaft and hanging it so that when the perch or pole of the wagon or carriage is depressed in descending a hill the roller will swing against the hub or some part of the wheel and be turned by it, so as to apply the brake to the wheels and hold it onto them until the perch or pole is raised again; also, in applying a cam to the shaft by the side of the before-mentioned roller, so as to push the shaft from the hub of the wheel and release the roller when the perch or pole is raised after being depressed.

To enable others skilled in the art to make and use my improvements, I will proceed to describe their construction and operation, referring to the drawings, in which the same letters indicate like parts in each of the figures.

Figure 1 is a plan or top view of such parts of a carriage as are necessary to show my improvements. Fig. 2 is a side elevation with one wheel omitted.

In the drawings, A is the axle, B B the wheels, and C the bed piece or bar on the top of the axle.

D is the perch connecting the axle A with the front axle, which is not represented.

E E are wings or braces to support the perch D.

F is a board fastened to the braces E to support the brake-bar G, which traverses on it, and is held in place on the board by the brackets H H. (Shown in dotted lines in Fig. 1.)

The brake-bar G is made in the form shown in the drawings and provided with brake-blocks I I to act on the wheels B B. The draw-bar J is fastened to the brake-bar G and traverses in the bar C, and is connected by the chain K to the shaft L, one end of which shaft is fitted to turn in the stand M, fastened to the axle A.

There is a C-shaped stand fastened to the axle A and bar C, with two arms N and P for the link Q and lever R, which are hung to the arm N, so as to swing freely in the slot in the arm P toward and from the axle. The shaft L passes through and turns freely in the link Q and has a grooved roller S fastened to it, so that when the carriage begins to descend a hill or the perch is depressed or lowered at the forward end the link Q and roller S swing toward the axle and the groove in the roller S embraces the rib T on the hub of the wheel B, which turns the roller S and winds the chain K around the shaft L and draws the brake against the wheels and stops or retards their motion until the carriage arrives at the bottom of the hill or the perch is raised, so that the roller S may swing or be pushed from the hub by the cam U and release the brake.

The shaft L and roller S are pushed from the hub by the cam U, which turns freely on the shaft L, except it is stopped by a pin V in the lever R, which has a weight W at its lower end, and when the perch is depressed so as to swing the roller S against the hub the lever and pin swing forward and prevent the cam from turning and from coming in contact with the hub; but as soon as the perch is raised the lever and pin swing from the cam and leave it free to turn by the jarring of the wagon, and as soon as the high part of the cam comes in contact with the hub it pushes the shaft and roller from the hub and releases the brake.

From the above description it is apparent that when the fore end of the carriage is lowered or depressed in going down a hill the groove in the wheel S will fall against and embrace the rib T on the hub and wind the brake onto the wheels and hold it there by its own friction until it comes to the bottom of the hill and the lever R swings back, carrying the pin V and releasing the cam U, leaving it free to turn by the friction of the hub of the wheel, and as the high side of the cam is turned against the hub it forces the grooved roller from its embrace of the rib and leaves it free to roll back and release the brake. The friction of a groove and rib as described is far more powerful and effective than two rollers which are plain or straight across their edges.

The form of the cam U is shown in Fig. 3.

This cam serves an important purpose in my improved brake, as it is sure to effect a release of the brake soon after the perch is raised.

I believe I have described and represented my improvements in carriage-brakes so as to enable any person skilled in the art to make and use them.

I do not claim the operating or applying of brakes by gravitation, as heretofore used; but I claim—

1. Hanging or arranging the shaft that winds the chain and applies the brake, substantially as described, so that when the fore end of the pole or perch is depressed in descending a hill the roller S will swing against the wheel or hub and be turned so as to wind the chain and apply the brake, and when the fore end of the pole is raised the wheel will swing from the hub and release the brake.

2. The cam U on the shaft L, for the purpose specified, substantially as described.

LEWIS R. CARPENTER.

Witnesses:
R. M. CLARKE,
TALL SLOUGH.